United States Patent
Zhong et al.

(10) Patent No.: US 9,898,823 B2
(45) Date of Patent: Feb. 20, 2018

(54) DISPARITY DERIVING APPARATUS, MOVABLE APPARATUS, ROBOT, METHOD OF DERIVING DISPARITY, METHOD OF PRODUCING DISPARITY, AND STORAGE MEDIUM

(71) Applicants: Wei Zhong, Liao Ning (CN); Kiichiroh Saitoh, Kanagawa (JP)

(72) Inventors: Wei Zhong, Liao Ning (CN); Kiichiroh Saitoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/662,519

(22) Filed: Mar. 19, 2015

(65) Prior Publication Data
US 2015/0279045 A1 Oct. 1, 2015

(30) Foreign Application Priority Data

Mar. 27, 2014 (JP) ................................. 2014-066057
Mar. 16, 2015 (JP) ................................. 2015-051957

(51) Int. Cl.
*G06T 7/00* (2017.01)
*G06K 9/62* (2006.01)
(Continued)

(52) U.S. Cl.
CPC ........ *G06T 7/0075* (2013.01); *G06K 9/00791* (2013.01); *G06K 9/00818* (2013.01);
(Continued)

(58) Field of Classification Search
CPC ......... G06T 7/0075; G06T 2207/10012; G06T 2207/10028; G06T 2207/20228;
(Continued)

(56) References Cited

U.S. PATENT DOCUMENTS

| 2005/0105610 A1* | 5/2005 | Sung | ........................ | G06T 5/50 375/240.01 |
| 2006/0120712 A1* | 6/2006 | Kim | ...................... | G06T 7/0075 396/333 |
| 2008/0198924 A1* | 8/2008 | Ho | ....................... | H04N 19/597 375/240.01 |

FOREIGN PATENT DOCUMENTS

| CN | 1638491 A | 7/2005 |
| JP | 2006-090896 | 4/2006 |

(Continued)

OTHER PUBLICATIONS

International Journal of Computer Vision Apr. 2002, vol. 47, Issue 1, pp. 229-246 Real-Time Correlation-Based Stereo Vision with Reduced Border Errors Heiko Hirschmüller, Peter R. Innocent, Jon Garibaldi.*

(Continued)

*Primary Examiner* — Kim Vu
*Assistant Examiner* — Michael Vanchy, Jr.
(74) *Attorney, Agent, or Firm* — Oblon, McClelland, Maier & Neustadt, L.L.P.

(57) ABSTRACT

A disparity deriving apparatus for deriving disparity of an object includes a calculator to calculate costs between a first reference area in a reference image and each one of corresponding areas corresponding to the first reference area in the comparison image, and costs between a second reference area, surrounding the first reference area in the reference image, and each one of corresponding areas corresponding to the second reference area in a comparison image; a synthesizer to synthesize the costs of the first reference area and the second reference area as synthesis costs; a deriving unit to derive a disparity value of the object captured in the first reference area based on the synthesized synthesis costs; and a correction unit to apply a spatial filter to a local region, (Continued)

composed of a plurality of areas, in the first reference image to correct a disparity value of the local region.

19 Claims, 13 Drawing Sheets

(51) Int. Cl.
*H04N 13/02* (2006.01)
*G06K 9/00* (2006.01)
*G06T 7/593* (2017.01)
*H04N 13/00* (2018.01)

(52) U.S. Cl.
CPC ............ *G06K 9/6212* (2013.01); *G06T 7/593* (2017.01); *G06T 7/97* (2017.01); *G06T 2207/10012* (2013.01); *G06T 2207/10028* (2013.01); *G06T 2207/20032* (2013.01); *G06T 2207/20228* (2013.01); *G06T 2207/30236* (2013.01); *G06T 2207/30252* (2013.01); *G06T 2207/30261* (2013.01); *H04N 13/0239* (2013.01); *H04N 13/0296* (2013.01); *H04N 2013/0081* (2013.01); *H04N 2013/0088* (2013.01)

(58) Field of Classification Search
CPC ........... G06T 2207/10021; G06T 7/593; G06T 2207/20032; H04N 2013/0081; H04N 2013/0088; H04N 13/0018; H04N 13/0022; H04N 13/0271; H04N 2013/0074; G06K 9/6215
See application file for complete search history.

(56) References Cited

FOREIGN PATENT DOCUMENTS

JP    2012-181142    9/2012
JP    2012-198077    10/2012

OTHER PUBLICATIONS

Extended European Search Report dated Sep. 11, 2015 in Patent Application No. 15160970.8.
Heiko Hirschmüller, et al., "Real-Time Correlation-Based Stereo Vision with Reduced Border Errors" International Journal of Computer Vision, vol. 47, No. 1-3, XP002601447, 2002, pp. 229-246.
Haixu Liu, et al., "A Novel Method for Stereo Matching Using Gabor Feature Image and Confidence Mask" Visual Communications and Image Processing (VCIP), XP032543618, 2013, pp. 1-6.
Heiko Hirschmüller, "Stereo Processing by Semiglobal Matching and Mutual Information" IEEE Transactions on Pattern Analysis and Machine Intelligence, IEEE Computer Society, vol. 30, No. 2, XP011246438, 2008, pp. 328-341.
Xiaoyan Flu, et al., "A Quantitative Evaluation of Confidence Measures for Stereo Vision" IEEE Transactions on Pattern Analysis and Machine Intelligence, IEEE Computer Society, vol. 34, No. 11, XP011463134, 2012, pp. 2121-2133.
Combined Office Action and Search Report dated Apr. 12, 2017 in Chinese Patent Application No. 201510134914.1 (with English translation of categories of cited documents).

\* cited by examiner

REFERENCE IMAGE

COMPARISON IMAGE

WHEN ALL PIXELS ARE
APPLIED WITH FILTERING

WHEN SPECIFIC PIXEL IS
NOT APPLIED WITH FILTERING

FIG. 17A
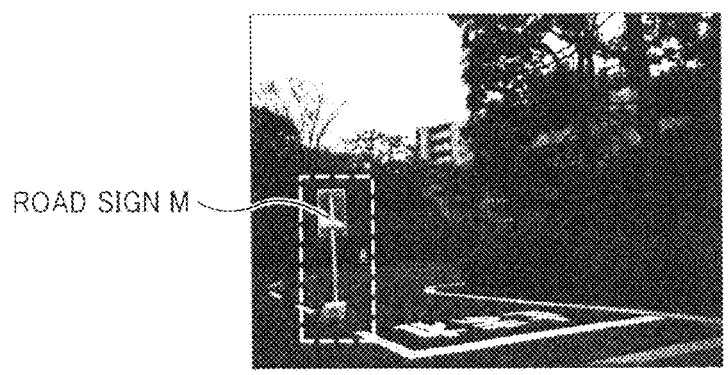
FIG. 17B   FIG. 17C  FIG. 17D  FIG. 17E
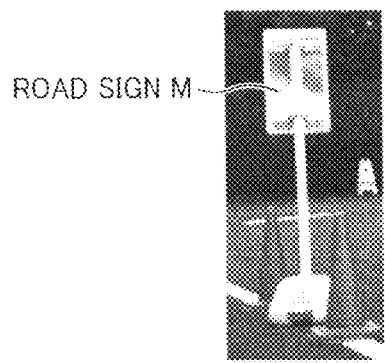 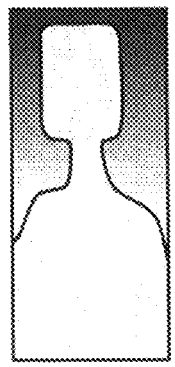 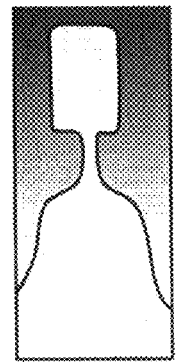 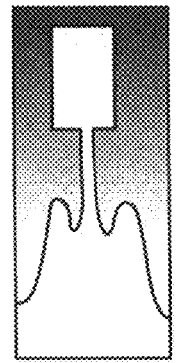

DISPARITY DERIVING APPARATUS, MOVABLE APPARATUS, ROBOT, METHOD OF DERIVING DISPARITY, METHOD OF PRODUCING DISPARITY, AND STORAGE MEDIUM

CROSS-REFERENCE TO RELATED APPLICATION

This application claims priority pursuant to 35 U.S.C. § 119(a) to Japanese Patent Application Nos. 2014-066057 filed on Mar. 27, 2014 and 2015-051957 filed on Mar. 16, 2015 in the Japan Patent Office, the disclosures of which are hereby incorporated by reference herein in their entirety.

BACKGROUND

Technical Field

The present invention relates to deriving disparity of an object based on a reference image and a comparison image each obtained by capturing an image of the same object.

Background Art

A range-finding method using disparity information is conventionally known, in which disparity of an object observed by a stereo camera is derived by stereo imaging, and a disparity value indicating this disparity is used to measure the distance from the stereo camera to the object based on the principle of triangulation. With this range-finding method, for example, the distance between two automobiles or between an automobile and obstacles can be measured and utilized for preventing automobile collisions. The range-finding method may be also referred to as the distance measurement method.

Specifically, a stereo matching process is employed for deriving disparity. In the stereo matching process, a reference image is captured by one camera of a stereo camera, composed of two cameras, and a comparison image is captured by the other camera of the stereo camera. Then, by successively shifting a plurality of candidate corresponding pixels in the comparison image relative to one reference pixel set in the reference image, a position of a corresponding pixel having an image signal that is the most similar to an image signal of the reference pixel set in the reference image is identified to derive a disparity value between the reference image and the comparison image. Typically, luminance values of image signals obtained by the two cameras are compared to compute "cost" (hereinafter, cost means "dissimilarity") of the compared luminance values, with which a position of a pixel having the smallest cost is identified. Further, the stereo matching process can employ a block matching process to prevent mismatching, in which luminance at edges in an image where luminance changes greatly are compared as disclosed in JP-2006-090896-A.

However, for areas having weak texture (i.e., an area where the magnitude of luminance change of an object is weak) and the features to be extracted are themselves diminished, edge detection may not be effective.

In view of this ineffective edge detection, a method that derives more accurate disparity for an object having weak texture is proposed as disclosed in JP-2012-181142-A. In this method, the cost of one reference pixel in a reference image and also the costs of other pixels around the one reference pixel are aggregated to derive disparity for an object having weak texture. With this method, disparity of the entirety of the object can be derived and used not only for range-finding but also classification of the object (e.g., whether the object is a sign or an automobile).

When the method disclosed in JP-2012-181142-A is applied for capturing a scene including an object having weak texture and an object having strong texture that may exist at relatively far positions with each other, disparity can be derived for the weak-texture object and the strong-texture object on a reference image. However, disparity at one area composed of pixels corresponding to the strong-texture object may affect disparity at another area composed of pixels corresponding to the weak-texture object. Therefore, disparity detection cannot be performed with high precision.

SUMMARY

In one aspect of the present invention, a disparity deriving apparatus for deriving disparity of an object based on a reference image of the object captured at a first image capturing position and a comparison image of the object captured at a second image capturing position is devised. The disparity deriving apparatus includes a calculator to calculate costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image; a synthesizer to synthesize the costs of the first reference area, and the costs of the second reference area as synthesis costs; a deriving unit to derive a disparity value of the object captured in the first reference area based on the synthesis costs synthesized by the synthesizer; and a correction unit to apply a spatial filter to a local region, composed of a plurality of areas, in the first reference image to correct a disparity value of the local region.

In another aspect of the present invention, a method of deriving disparity of an object based on a reference image of the object captured at a first image capturing position and a comparison image of the object captured at a second image capturing position is devised. The method includes the steps of calculating costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image; synthesizing the costs of the first reference area, and the costs of the second reference area as synthesis costs; deriving a disparity value of the object captured in the first reference area based on the synthesis costs synthesized by the synthesizing step; and applying a spatial filter to a local region, composed of a plurality of areas, in the first reference image to correct a disparity value of the local region.

In another aspect of the present invention, a method of producing disparity of an object based on a reference image of the object captured at a first image capturing position and a comparison image of the object captured at a second image capturing position is devised. The method includes the steps of calculating costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image; synthesizing the costs of the first reference area, and the costs of the second reference area as synthesis costs; deriving a disparity value of the object captured in the first reference area based on the synthesis costs synthesized by the synthesizing step; and applying a spatial filter to a local region, composed of a plurality of areas, in the first reference image to correct a disparity value of the local region.

In another aspect of the present invention, a non-transitory computer-readable carrier medium storing a program that, when executed by a computer, causes the computer to execute a method of deriving disparity of an object based on a reference image of the object captured at a first image capturing position and a comparison image of the object captured at a second image capturing position is devised. The method includes the steps of calculating costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image; synthesizing the costs of the first reference area, and the costs of the second reference area as synthesis costs; deriving a disparity value of the object captured in the first reference area based on the synthesis costs synthesized by the synthesizing step; and applying a spatial filter to a local region, composed of a plurality of areas, in the first reference image to correct a disparity value of the local region.

In another aspect of the present invention, a disparity deriving apparatus for deriving disparity of an object based on a reference image of the object captured at a first image capturing position and a comparison image of the object captured at a second image capturing position s devised. The disparity deriving apparatus includes a calculator to calculate costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image; a synthesizer to synthesize the costs of the first reference area, and the costs of the second reference area as synthesis costs; a deriving unit to derive a disparity value of the object captured in the first reference area based on the synthesis costs synthesized by the synthesizer; and a correction unit to apply a spatial filter to a local region, composed of a plurality of areas, in the first reference image to correct disparity values of the local region based on determination whether excluding one or more of the areas of the local region from an application of the spatial filter, and outputs the corrected disparity value to an object recognition apparatus that recognizes the object in the reference image or the comparison image. An image area corresponding to the object, expressed by the disparity value derived by the deriving unit and recognizable by the object recognition apparatus, becomes smaller as the given value becomes greater.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 17A is an example of a reference image;

FIG. 17B is a part of the reference image of FIG. 17A;

FIG. 17C is a high density disparity image generated by applying a conventional SGM method to the reference image of FIG. 17B;

FIG. 17D is a high density disparity image generated by correcting the reference image of FIG. 17B with a disparity correction unit using a given first value V1; and FIG. 17E is a high density disparity image generated by correcting the reference image of FIG. 17B with a disparity correction unit using a given second value V2 greater than the given first value V1 (V1<V2).

Figure 1:
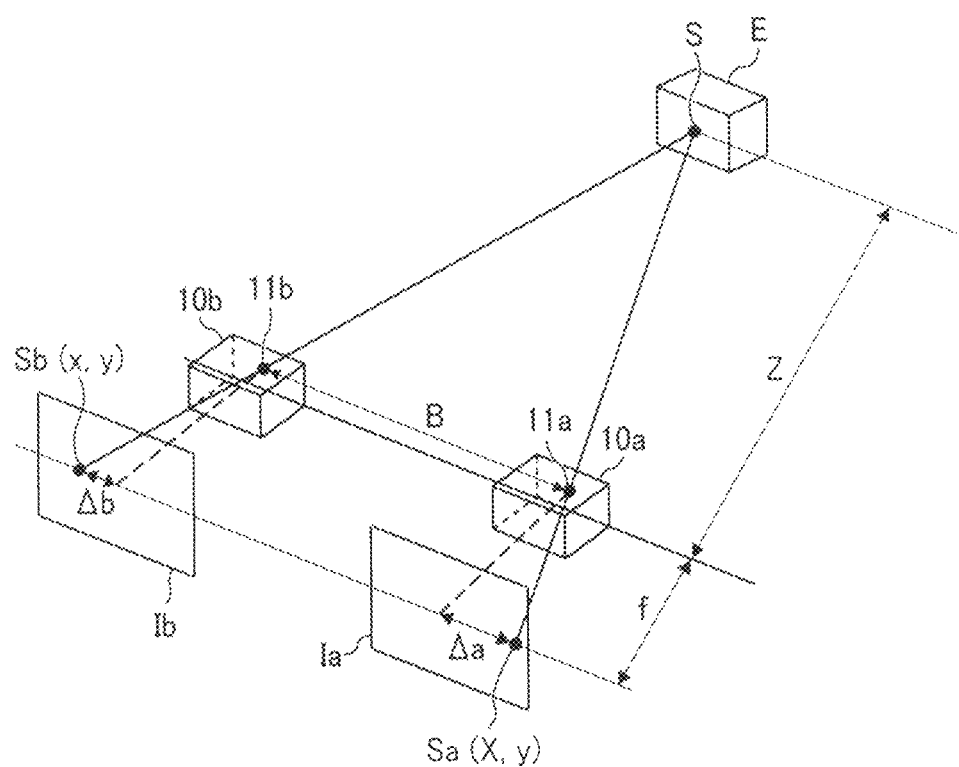
FIG. 1 illustrates the principle of computing the distance from an imaging device to an object.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to one or more example embodiments are described hereinafter.

(Overview of Range-Finding Method Using SGM)

Referring to FIGS. 1 to 6, a description is given of a range-finding method using semi-global matching (SGM). Since SGM is disclosed in "Accurate and Efficient Stereo Processing by Semi-Global Matching and Mutual Information" (author; Hirschmuller, H. Inst. of Robotics & Mechatronics Oberpfaffenhofen, German Aerosp. Center, Wessling, Germany), only a brief explanation of SGM is given below.

(Principle of Measuring Distance)

Referring to FIG. 1, a description is given of the principle of measuring distance from a stereo camera to an object, in which disparity of the object is derived as a disparity value by conducting stereo imaging using the stereo camera, and the derived disparity value is used to measure the distance from the stereo camera to the object.

FIG. 1 illustrates the principle of computing the distance from the stereo camera used as an imaging device to an object. In the following description, the range-finding process is described based on the units of pixels rather than the units of areas composed of a plurality of pixels for the simplification of description. When the range-finding process is conducted based on the unit of the areas composed of the plurality of pixels, an area including a reference pixel is used as a reference area, and an area including a corresponding pixel, which may correspond to the reference pixel, is used as a corresponding area. Further, the reference area may only be composed of a single reference pixel and the corresponding area may only be composed of a single corresponding pixel.

(Calculation of Disparity)

As illustrated in FIG. 1, the stereo camera includes an imaging device 10a and an imaging device 10b, which are set parallel at the same height in the configuration of FIG. 1. The imaging device 10a and the imaging device 10b capture images of the same object to generate a reference image Ia and a comparison image Ib, respectively. In the configuration of FIG. 1, a point S on the object E in a three-dimensional space is captured at one position of the imaging device 10a and also at one position of the imaging device 10b, wherein these two positions of the imaging device 10a and the imaging device 10b are on the same horizontal line, which means that the point S is captured as a point Sa(X,y) in the reference image Ia and a point Sb(x,y) in the comparison image Ib. In this configuration, a disparity value Δ can be expressed by equation (1) below based on the point Sa(X,y) in the coordinates of the imaging device 10a and the point Sb(x,y) in the coordinates of the imaging device 10b.

$$\Delta = X - x \quad (1)$$

In the configuration of FIG. 1, the disparity value is expressed by Δ=Δa+Δb, wherein Δa is the distance between the point Sa(X,y) in the reference image Ia and the point of intersection of the normal line extending from the imaging lens 11a to the imaging plane, and Δb is the distance between the point Sb(x,y) in the comparison image Ib and the point of intersection of the normal line extending from the imaging lens 11b to the imaging plane.

(Calculation of Distance)

The distance Z between the imaging devices 10a/10b and the object E can be calculated or computed using the disparity value Δ. Specifically, the distance Z is a distance from the plane including the focus position of the imaging lens 11a and the focus position of the imaging lens 11b to the point S on the object E. As illustrated in FIG. 1, the distance Z can be calculated by equation (2) below using the focal length "f" of the imaging lens 11a and the imaging lens 11b, the base line length "B" that is a length between the imaging lens 11a and the imaging lens 11b, and the disparity value Δ.

$$Z = (B \times f)/\Delta \quad (2)$$

As indicated by this equation (2), the greater the disparity value Δ, the smaller the distance Z, and the smaller the disparity value Δ, the greater the distance Z.

(SGM)

Referring to FIGS. 2 to 6, a description is given of a range-finding method using SGM.

Figure 2C:
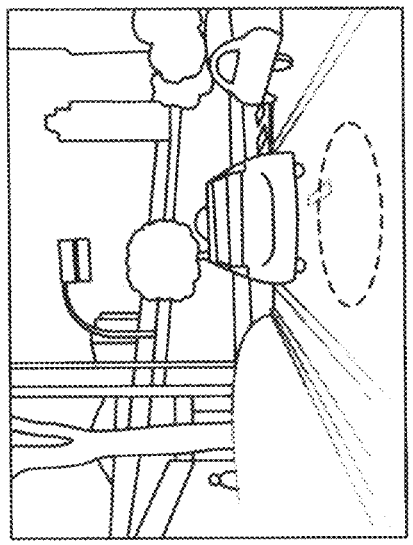
FIG. 2C is an example of an edge disparity image generated from the reference image of FIG. 2A.
Figure 2B:
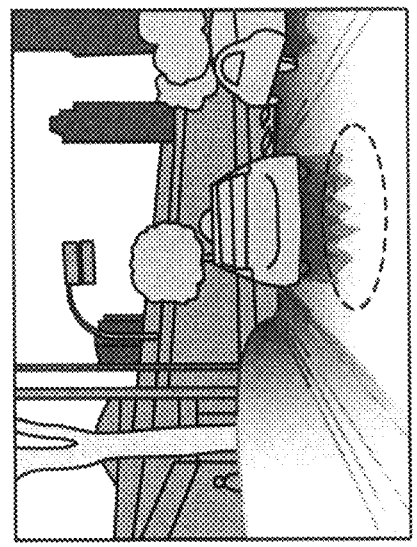
FIG. 2B is an example of a high density disparity image generated from the reference image of FIG. 2A.
Figure 2A:
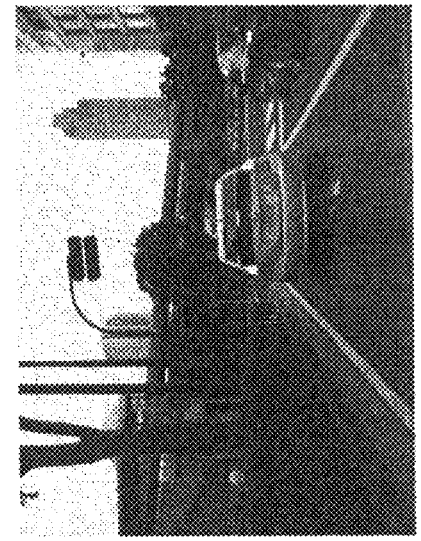
FIG. 2A is an example of a reference image.

FIG. 2A is an example of a reference image, FIG. 2B is a conceptual image of a high density disparity image generated from FIG. 2A, and FIG. 2C is a conceptual image of an edge disparity image generated from FIG. 2A, in which the reference image is an image representing one or more objects based on luminance. The high density disparity image is an image derived from the reference image by applying SGM, and represents disparity values at each of coordinates in the reference image. The edge disparity image is an image derived by applying the conventional block matching method, and represents disparity values only at areas having relatively strong texture such as edges in the reference image.

SGM is a method that derives the above described disparity values suitably even if an object having weak texture is detected, and derives the high density disparity image illustrated in FIG. 2B based on the reference image of FIG. 2A. Further, when the block matching method is applied, the edge disparity image illustrated in FIG. 2C is derived based on the reference image of FIG. 2A. As can be understood by comparing the ovals enclosed by the broken lines in FIGS. 2B and 2C, the high density disparity image can express detailed information of an object having weak texture such as a road surface compared to the edge disparity image, and thereby a more detailed range-finding can be conducted based on the high density disparity image.

SGM does not derive a disparity value right after calculating the cost (e.g., dissimilarity), but SGM derives a disparity value by calculating the cost and then calculating a synthesis cost (i.e., synthesized dissimilarity), in which a disparity image (e.g., high density disparity image) expressing disparity values for almost all of the pixels is finally derived.

The block matching method calculates the cost same as SGM does. However, the block matching method does not calculate the synthesis cost, but derives disparity values only at areas having relatively strong texture such as edges in a captured image. Further, the method of deriving disparity values can be also the method of producing disparity values.

(Calculation of Cost)

Figure 3A:
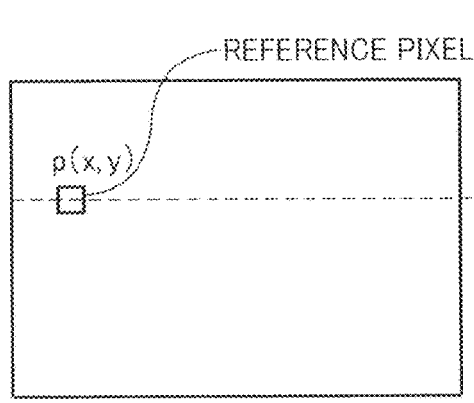
FIG. 3A is a conceptual diagram illustrating a reference pixel in a reference image.
Figure 3B:
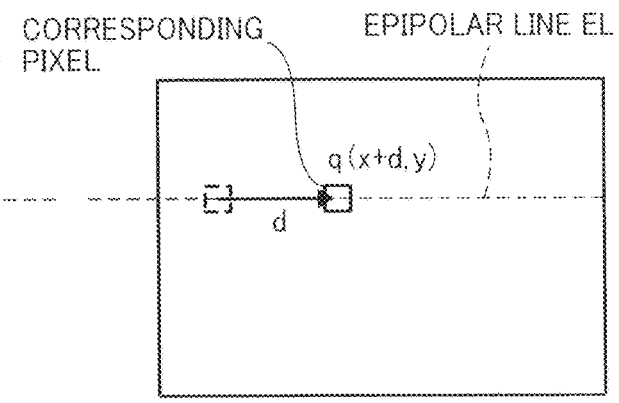
FIG. 3B is a conceptual diagram for explaining calculating cost by successively shifting candidate corresponding pixels in a comparison image relative to the reference pixel shown in FIG. 3A.
Figure 4:
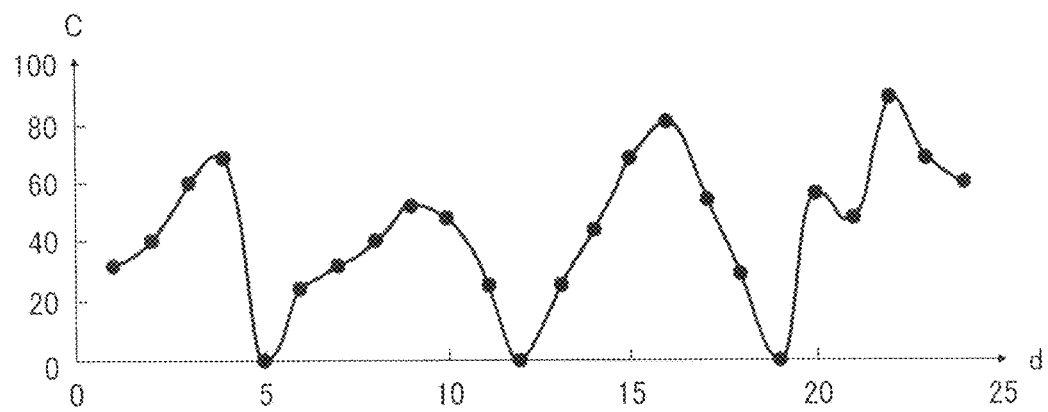
FIG. 4 is a graph of a cost profile plotting costs with respect to shift values.

Referring to FIGS. 3 and 4, a description is given of a method of calculating the cost C(p,d). FIG. 3A is a conceptual diagram illustrating a reference pixel in a reference image, and FIG. 3B is a conceptual diagram for explaining calculating the cost by successively shifting candidate corresponding pixels in a comparison image relative to the reference pixel shown in FIG. 3A. FIG. 4 is a graph of a cost profile plotting costs with respect to shift values. In this configuration, the corresponding pixel is a pixel in the comparison image that is the most similar, for example, in luminance value to the reference pixel in the reference image. In the following description, it is assumed that C(p,d) is equivalent to C(x,y,d), as p represents (x, y).

As illustrated in FIG. 3A, a reference pixel p(x,y) is set in the reference image. As illustrated in FIG. 3B, a plurality of candidate corresponding pixels q(x+d,y) that may correspond to the reference pixel p(x,y) are set on the epipolar line EL in the comparison image, wherein the epipolar line EL is set in the reference image and the comparison image as illustrated in FIGS. 3A and 3B. Based on luminance of the reference pixel p(x,y) and luminance of the plurality of candidate corresponding pixels q(x+d,y), the cost C(p,d) of each of the candidate corresponding pixels q(x+d,y) with respect to the reference pixel p(x,y) is calculated. In this description, "d" corresponds to a shift value of each of the candidate corresponding pixels "q" with respect to the reference pixel "p," and the shift value "d" is expressed, for example, in units of pixels. That is, in the example case of FIG. 3 (FIGS. 3A and 3B), the cost C(p,d), which indicates a level of dissimilarity between luminance of the candidate corresponding pixels q(x+d,y) and luminance of the reference pixel p(x,y), is calculated by successively shifting the candidate corresponding pixels q(x+d,y) one pixel by one pixel in a pre-set range or region (e.g., 0<d<25). The cost C can be calculated by applying any known method such as SAD (Sum of Absolute Difference) when the cost C represents a level of dissimilarity.

As illustrated in the graph of FIG. 4, the calculated costs C(p,d) can be expressed as a cost profile by plotting the calculated costs C with respect to the shift values "d." In the graph of FIG. 4, since the cost C becomes zero (0) at the shift values d=5, 12, 19, the minimum value of the cost C cannot be identified from the graph of FIG. 4. Therefore, in a case of an object having weak texture, it is difficult to identify the minimum value of the cost C.

(Calculation of Synthesis Cost)

Figure 5:
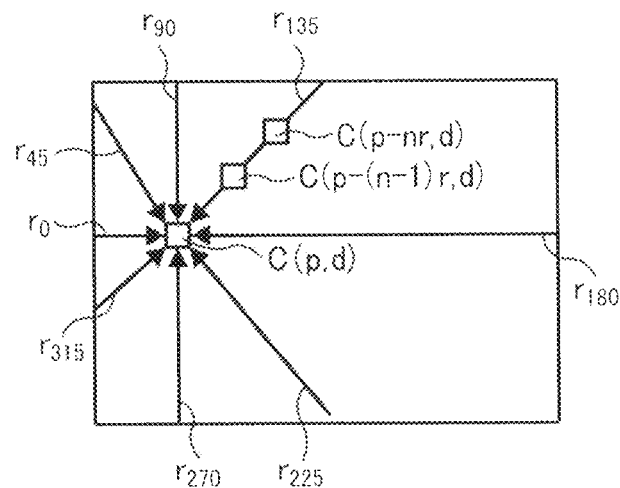
FIG. 5 is a conceptual diagram for explaining deriving a synthesis cost.
Figure 6:
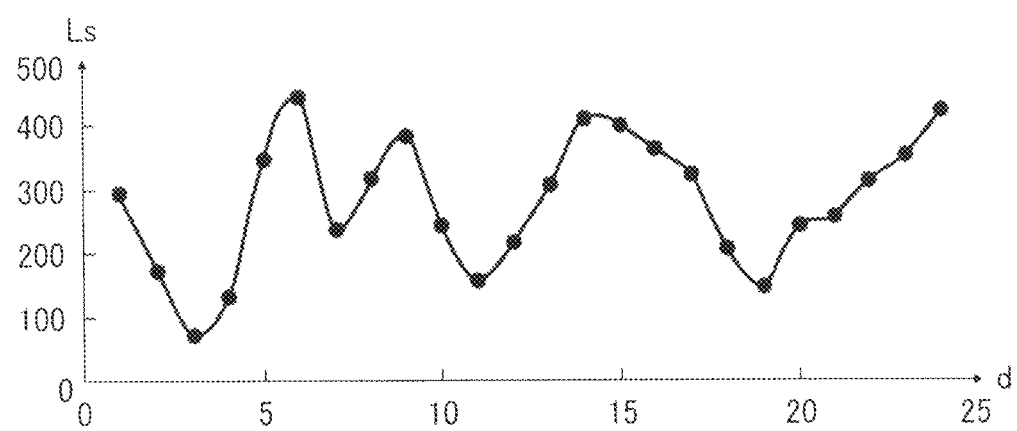
FIG. 6 is a graph of a synthesis cost profile plotting synthesis costs with respect to disparity values.

Referring to FIGS. 5 and 6, a description is given of a method of calculating a synthesis cost Ls(p,d). FIG. 5 is a conceptual diagram for describing calculation of the synthesis cost Ls. FIG. 6 is a graph of a synthesis cost profile plotting synthesis costs with respect to disparity values. The synthesis cost Ls(p,d) is obtained by calculating the cost C(p,d) for one reference pixel p(x,y), by calculating cost C for other pixels p'(x',y') used as other reference pixels existing at positions surrounding the one reference pixel p(x,y) such as from near to far positions with respect to the reference pixel p(x,y), and by aggregating or converging the cost C(p,d) for the one reference pixel p(x,y) and the costs C for other reference pixels p'(x',y') as the synthesis cost Ls(p,d).

A description is given of a method of calculating the synthesis cost Ls(p,d) in detail. To calculate the synthesis cost Ls(p,d), at first, it is necessary to calculate a directional path cost Lr(p,d). Equation (3) is used for calculating the directional path cost Lr(p,d), and equation (4) is used for calculating the synthesis cost Ls.

$$Lr(p,d)=C(p,d)+\min\{(Lr(p-r,d),Lr(p-r,d-1)+P1,Lr(p-r,d+1)+P1,Lr\min(p-r)+P2\} \quad (3)$$

In the equation (3), "r" indicates a direction vector along the aggregated direction having two directional components such as the x direction component and the y direction component. The term min{ } is a function for obtaining the minimum value. Lrmin(p−r) indicates the minimum value of Lr(p−r,d) when the shift value "d" is changed in the coordinates where "p" is shifted by one pixel in "r" direction. It should be noted that Lr is recurrently applied as expressed in the equation (3). P1 and P2 are fixed parameters that can be set by experiments in advance such that the disparity values Δ of adjacent reference pixels on the direction path are likely to be continuous. For example, P1=48 and P2=96.

As expressed in the equation (3), Lr(p,d) for the reference pixel p(x,y) can be obtained by adding the minimum value of the directional path cost Lr of pixels existing along "r" direction from the reference pixel p(x,y) illustrated in FIG. 5 to the cost C of the reference pixel p(x,y). As described above, Lr is obtained for each one of pixels existing along "r" direction one by one starting from the farthest end pixel, which is the farthest from the reference pixel p(x,y). Based on the Lr obtained for the pixels existing along "r" direction, the Lr(p,d) of the pixel p(x,y) along "r" direction can be obtained.

Then, a plurality of directional path costs Lr can be obtained along a plurality of directions. For example, as illustrated in FIG. 5, a plurality of directional path costs such as $Lr_0, Lr_{45}, Lr_{90}, Lr_{135}, Lr_{180}, Lr_{225}, Lr_{270}, Lr_{315}$ is obtained in eight directions, Then, the synthesis cost Ls is finally obtained by applying the equation (4) to the plurality of directional path costs Lr.

$$L_s(p, d) = \sum_8 Lr \quad (4)$$

The calculated synthesis costs Ls(p,d) can be expressed as a graph of a synthesis cost profile by plotting the synthesis costs Ls(p,d) with respect to the shift values "d" as illustrated in FIG. 6. In the example case of FIG. 6, the synthesis cost Ls becomes the minimum value or the smallest value when the shift value d=3, and thereby the disparity value Δ is derived as Δ=3. Although "r" is set to eight in the above description, "r" is not limited hereto. For example, the eight directions can be further divided into sixteen directions (two times of eight directions), twenty four directions (three times of eight directions), and so on.

In the above description, the synthesis cost Ls is calculated by applying the equation (4) that totals the directional path costs Lr for all of the directional paths "r" calculated by the equation (3), but the synthesis cost Ls is not limited hereto. For example, the directional path cost Lr in a single directional path can be used as the synthesis cost Ls, or the directional path costs Lr in two or more directional paths can be synthesized as the synthesis cost Ls.

Although the cost C is used as an indicator of "dissimilarity" in the above description, the cost C can be used as an indicator of "similarity" that is the opposite of "dissimilarity." When the cost C is used as an indicator of similarity, a known method such as Normalized Cross Correlation (NCC) can be used as the method of calculating the cost C, in which the disparity value Δ at which the synthesis cost Ls becomes the "maximum" is derived instead of using the disparity value Δ at which the synthesis cost Ls becomes the "minimum." In this description, the similarity and dissimilarity may be collectively referred to as "matching level" of the cost. The synthesis cost can be referred to aggregation cost, and the process of synthesizing costs can be referred to the process of aggregating costs.

(Description of Example Embodiments)

A description is given of a specific configuration of one or more example embodiments with reference to the drawings, in which an object recognition system 1 mounted on a vehicle such as an automobile is described as one example. Other than automobiles, the object recognition system 1 is mountable on vehicles such as motor bicycles, bicycles, wheelchairs, agricultural tractors, construction machines, or the like. Further, the object recognition system 1 is mountable on vehicles, which is an example of movable apparatuses, and also on robots, which is another example of movable apparatuses. The robots are not limited to the movable apparatuses but can be fixed apparatuses such as industrial robots fixed at a given place such as robots for factory automation (FA). Further, the fixed apparatuses may not be limited to the robots, but can be other apparatuses such as security monitoring cameras or the like.

(Configuration of Example Embodiment)

Figure 7A:
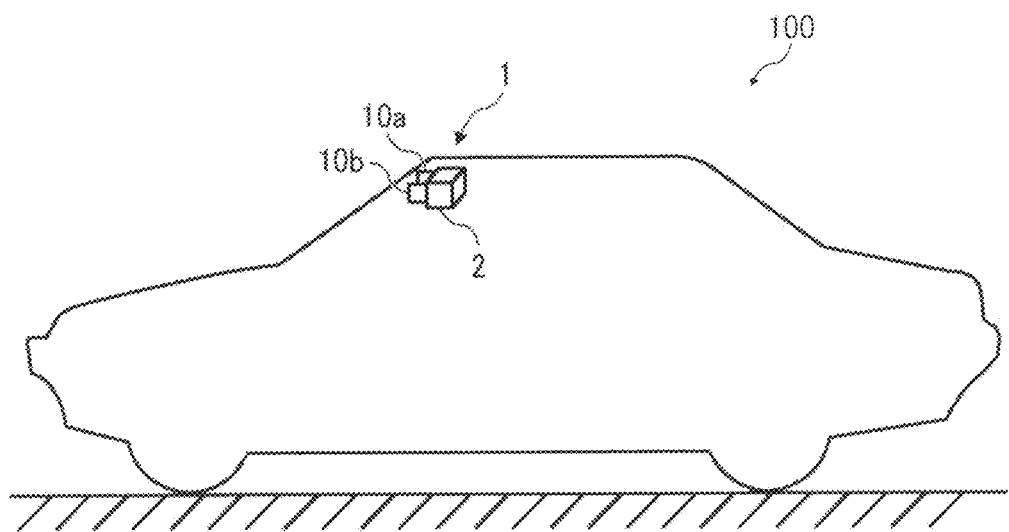
FIG. 7A is a schematic side view of a vehicle mounting an object recognition system according to one or more example embodiments.
Figure 7B:
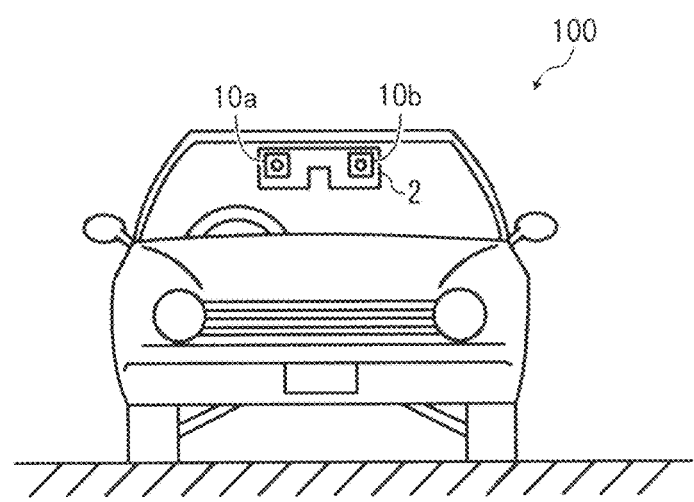
FIG. 7B is a schematic front view of the vehicle of FIG. 7A.
Figure 8:
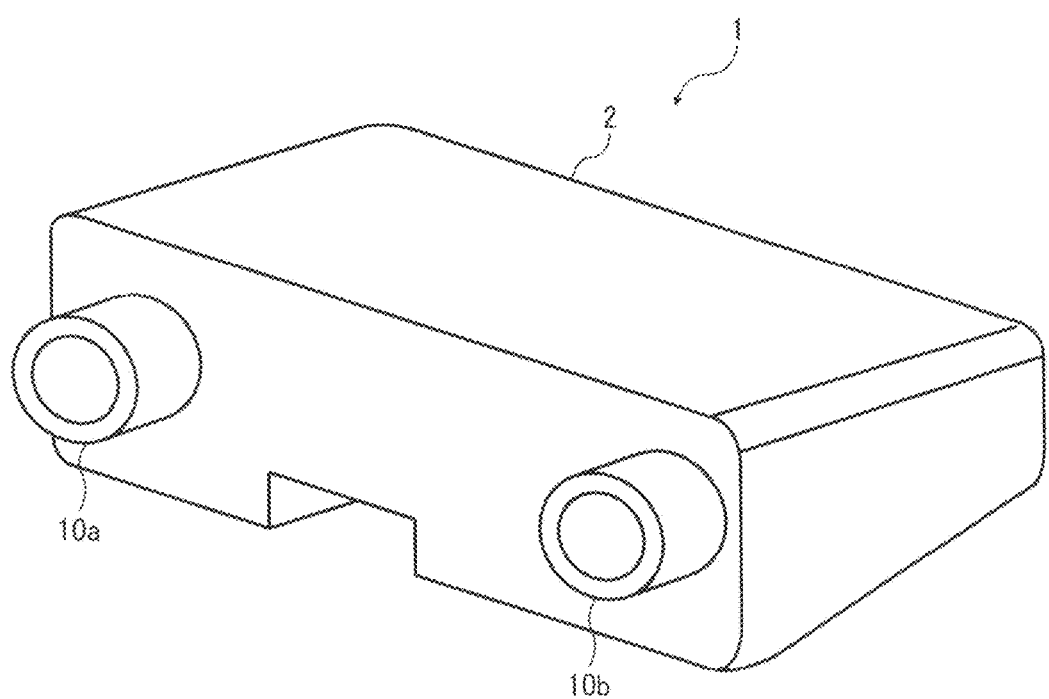
FIG. 8 is a schematic perspective view of the object recognition system of FIG. 7A.
Figure 9:
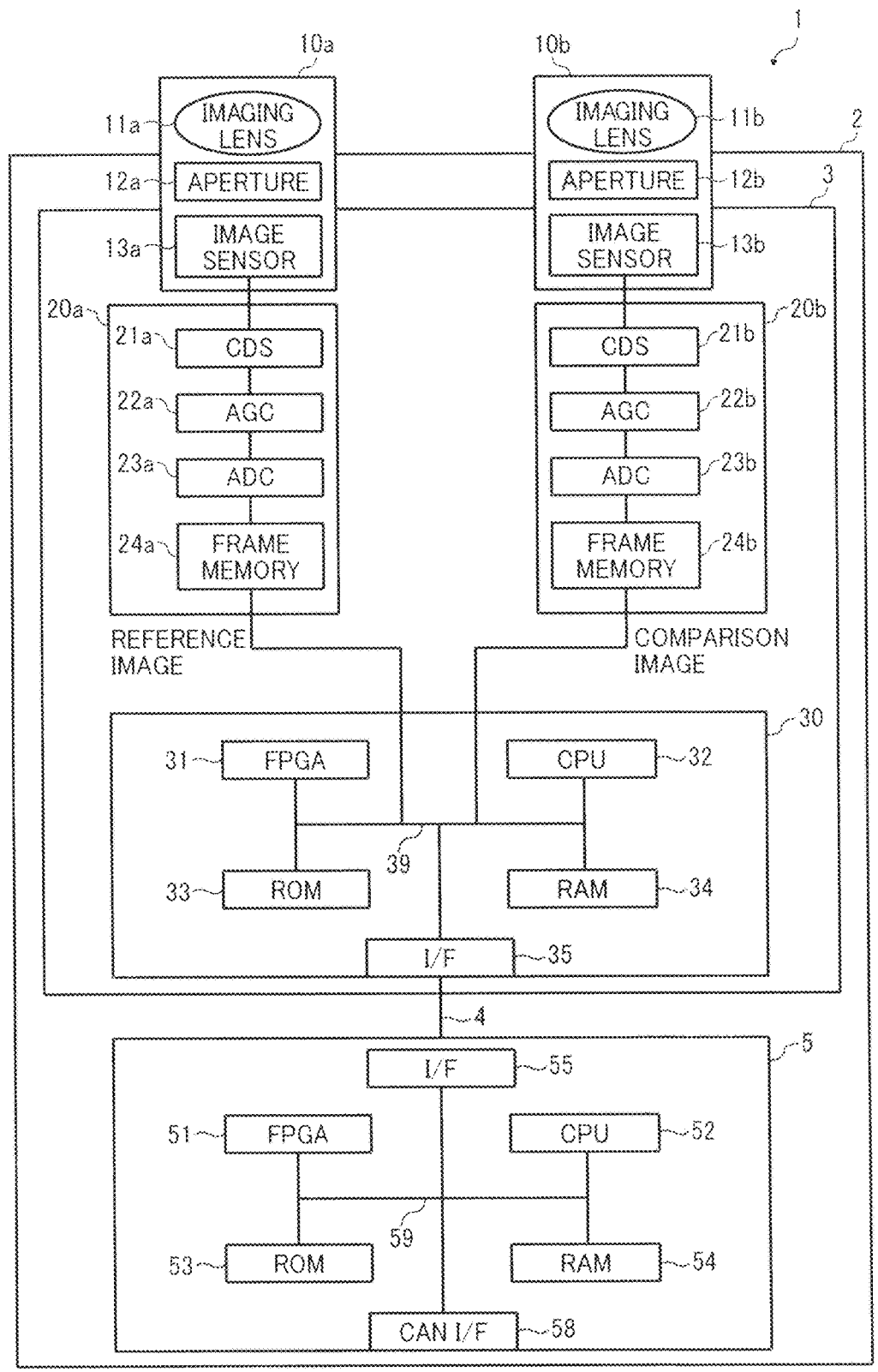
FIG. 9 is a block diagram example of hardware configuration of the object recognition system of FIG. 7.

A description is given of a configuration of the object recognition system 1 according to one or more example embodiments with reference to FIGS. 7 to 9.

(External Configuration)

With reference to FIGS. 7 and 8, a description is given of an external configuration of the object recognition system 1. FIG. 7A is a schematic side view of a vehicle 100 such as an automobile mounting the object recognition system 1, and FIG. 7B is a schematic front view of the vehicle 100 of FIG. 7A. FIG. 8 is a schematic perspective view of the object recognition system 1.

As illustrated in FIGS. 7A and 7B, the object recognition system 1 includes, for example, an imaging device 10a and an imaging device 10b. The imaging device 10a and the imaging device 10b can be disposed at least at one position to capture images of scenes ahead of the vehicle 100.

Further, as illustrated in FIG. 8, the object recognition system 1 includes, for example, a main body 2 and a pair of the imaging device 10a and imaging device 10b, shaped into a cylindrical shape, provided on the main body 2. Although the object recognition system 1 is disposed at the position shown in FIG. 7, the position to dispose the object recognition system 1 is not limited hereto. The object recognition system 1 can be disposed at any position on the apparatus depending on fields of application of the apparatus.

(Overall Hardware Configuration)

Referring to FIG. 9, a description is given of an overall hardware configuration of the object recognition system 1. FIG. 9 is a block diagram example of a hardware configuration of the object recognition system 1.

As illustrated in FIG. 9, the object recognition system 1 includes, for example, a disparity deriving apparatus 3, and an object recognition apparatus 5 in the main body 2. The disparity deriving apparatus 3 derives a disparity value Δ indicating disparity of the object E based on a plurality of images obtained by imaging the object E, and outputs a high density disparity image indicating the disparity value Δ for each pixel in the images. The object recognition apparatus 5 performs processing such as range-finding between the imaging devices 10a/10b and the object E based on a high density disparity image output from the disparity deriving apparatus 3.

A description is given of a hardware configuration of the disparity deriving apparatus 3. As illustrated in FIG. 9, the disparity deriving apparatus 3 includes, for example, the imaging device 10a, the imaging device 10b, a signal conversion device 20a, a signal conversion device 20b, and an image processing device 30.

The imaging device 10a includes, for example, an imaging lens 11a, an aperture 12a, and an image sensor 13a to generate an analog signal for reproducing an image by capturing images of scenes ahead of the vehicle 100 (FIG. 7). The imaging lens 11a is an optical element for diffracting light passing through the imaging lens 11a to form an image of an object on the image sensor 13a. The aperture 12a cuts off a part of the light passing through the imaging lens 11a to adjust the quantity of light input to the image sensor 13a to be described later. The image sensor 13a is, for example, a semiconductor device that converts the light input from the imaging lens 11a and the aperture 12a into an electrical analog image signal, and can be implemented, for example, as a charge coupled device (CCD) or a complementary metal oxide semiconductor (CMOS). The imaging device 10b has the same configuration as the imaging device 10a, and thereby a description of the imaging device 10b is omitted. The imaging lens 11a and the imaging lens 11b are installed such that their respective lens faces are on the same plane.

The signal conversion device 20a includes, for example, a correlated double sampling (CDS) 21a, an auto gain control (AGC) 22a, an analog digital converter (ADC) 23a, and a frame memory 24a to convert the analog signal for reproducing the captured image into image data in digital format. The CDS 21a removes noise from the analog image signal converted by the image sensor 13a by conducting correlated double sampling. The AGC 22a performs gain control for controlling the intensity of the analog image signal removed with the noise by the CDS 21a. The ADC 23a converts the analog image signal, gain-controlled by the AGC 22a, into image data in digital format. The frame memory 24a stores the image data converted by the ADC 23a.

Similarly, the signal conversion device 20b includes a CDS 21b, an AGC 22b, an ADC 23b, and a frame memory 24b to convert the analog image signal input from the imaging device 10b. The CDS 21b, AGC 22b, ADC 23b, and frame memory 24b respectively have the same configuration as the CDS 21a, AGC 22a, ADC 23a, and frame memory 24a, and thereby a description thereof is omitted.

Further, the image processing device 30 is a device for processing the image data converted by the signal conversion device 20a and the signal conversion device 20b. The image processing device 30 includes, for example, a field programmable gate array (FPGA) 31, a central processing unit (CPU) 32, a read only memory (ROM) 33, a random access memory (RAM) 34, an interface (I/F) 35, and a bus line 39 such as an address bus and a data bus for electrically connecting the components 31 to 35 as illustrated in FIG. 9.

The FPGA 31 is an integrated circuit that performs the process of calculating a disparity value Δ in the image represented by image data based on an instruction from the CPU 32. The CPU 32 controls entire operation performed by the disparity deriving apparatus 3. The ROM 33 stores an image processing program executable by the CPU 32 to control entire operation performed by the disparity deriving apparatus 3. The RAM 34 is used as a working area for the CPU 32. The I/F 35 is an interface for communicating with an I/F 55 of the object recognition apparatus 5, to be described later, through the bus line 4 such as an address bus and a data bus.

A description is given of a hardware configuration of the object recognition apparatus 5. As illustrated in FIG. 9, the object recognition apparatus 5 includes, for example, an FPGA 51, a CPU 52, a ROM 53, a RAM 54, an I/F 55, a controller area network (CAN) I/F 58, and a bus line 59 such as an address bus and a data bus for electrically connecting the components 51 to 55 and 58 as illustrated in FIG. 9.

The FPGA 51, CPU 52, ROM 53, RAM 54, I/F 55, and bus line 59 respectively have the same configuration as the FPGA 31, CPU 32, ROM 33, RAM 34, I/F 35, and bus line 39 in the image processing device 30, and thereby a description thereof is omitted. The I/F 55 is an interface for communicating with the I/F 35 of the image processing device 30 through the bus line 4. The ROM 53 stores an object recognition program executable by the CPU 52 to control entire operation performed by the object recognition apparatus 5. The CAN I/F 58 is an interface for communicating with an external controller or the like, and can be connected to, for example, a controller area network (CAN) of automobiles.

In the above described configuration, when a high density disparity image is transmitted from the I/F 35 of the image processing device 30 to the object recognition apparatus 5 through the bus line 4, the FPGA 51 calculates the distance Z between the imaging devices 10a/10b and the object E based on an instruction from the CPU 52 in the object recognition apparatus 5. Further, the FPGA 31 can calculate the distance Z under an instruction from the CPU 32 of the image processing device 30 instead of calculating the distance Z by the FPGA 51 under an instruction from the CPU 52 in the object recognition apparatus 5.

Further, as to the above described example embodiment, the two imaging devices 10a and 10b are used but not limited hereto. For example, one imaging device can be used, in which an imaging area is separated into two areas on one image sensor to capture the reference image and the comparison image of the object E. Further, the above described programs may be stored in a computer-readable storage medium or carrier medium with an installable or executable file format for distribution of programs. The storage medium or carrier medium is, for example, a compact disc read only memory (CD-ROM), a secure digital (SD) memory card or the like, but not limited thereto.
(Hardware Configuration of Main Part)

Figure 10:
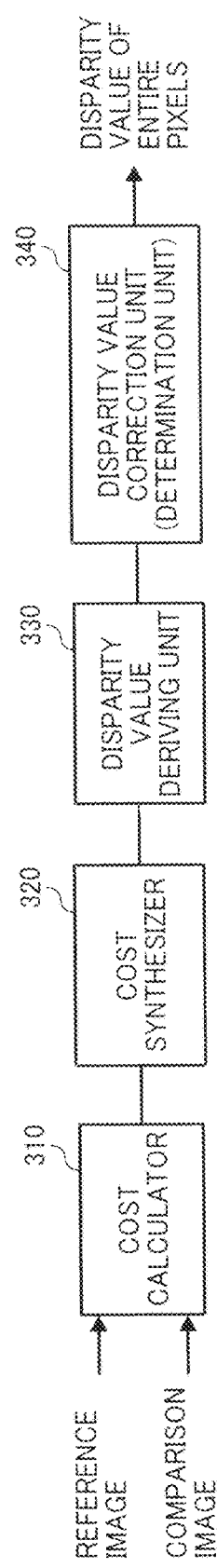
FIG. 10 is a schematic diagram illustrating a hardware configuration of a main part of a disparity deriving apparatus.
Figure 11:
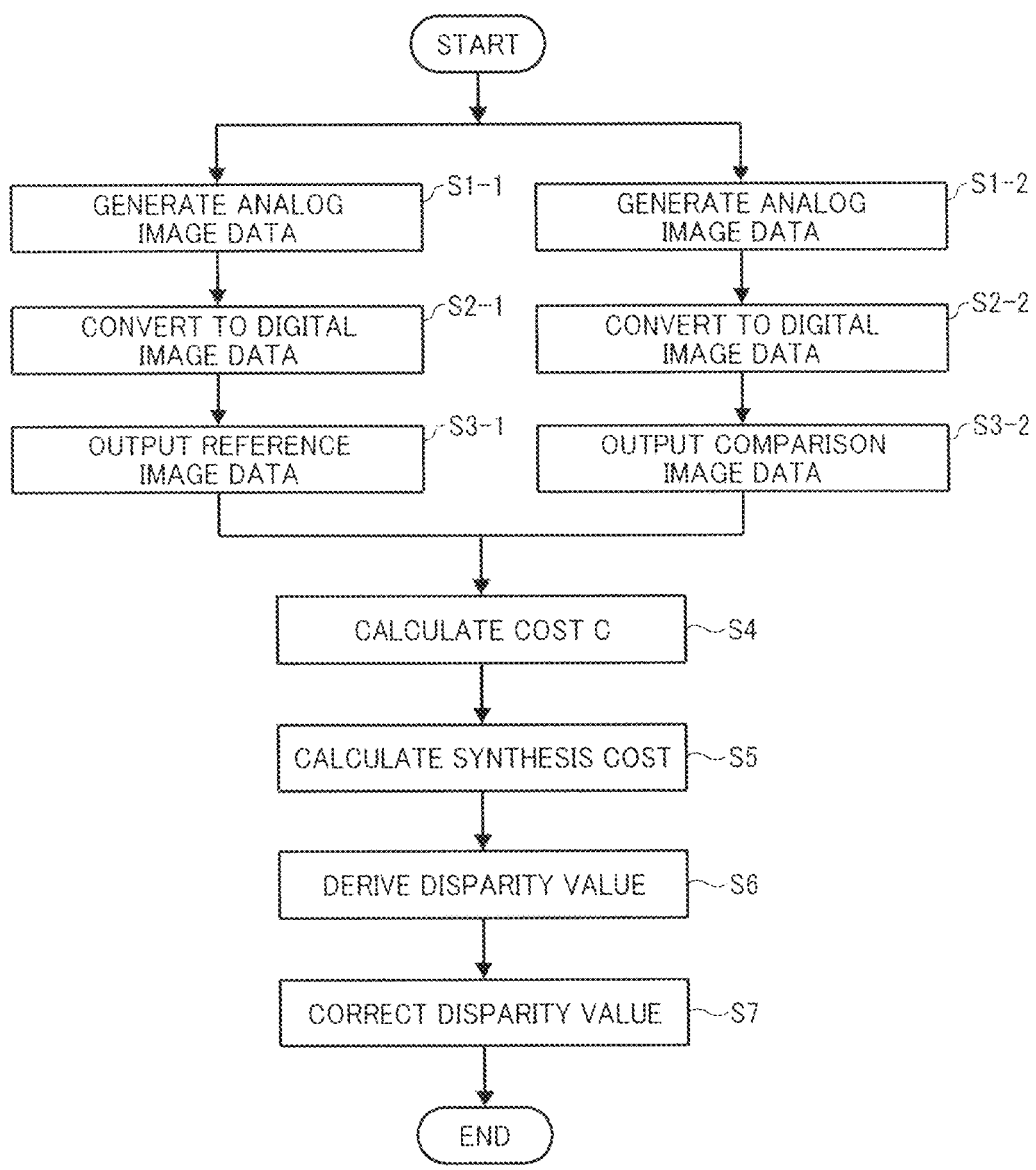
FIG. 11 is a flowchart illustrating operation of disparity computation according to one or more example embodiments.

Referring to FIGS. 3, 9 and 10, a description is given of a hardware configuration of a main part of the disparity deriving apparatus 3. FIG. 10 is a schematic hardware configuration of the main part of the disparity deriving apparatus 3, which corresponds to functional units of the FPGA 31 (FIG. 9).

As illustrated in FIG. 10, the FPGA 31 (FIG. 9) includes, for example, a cost calculator 310 as a calculator, a cost synthesizer 320 as a synthesizer, a disparity value deriving unit 330 as a deriving unit, and a disparity value correction unit 340 as a correction unit. In this example, it is assumed that these functional units are a part of the circuitry of the FPGA 31. Alternatively, any one of these functional units may be implemented in the form of instructions of the CPU 32 that are generated by executing the above-mentioned program read from any desired memory onto the working area for the CPU 32.

As illustrated in FIG. 3, the cost calculator 310 calculates and outputs the costs C of candidate corresponding pixels q(x+d,y) in the comparison image (FIG. 3B) with respect to a corresponding reference pixel p(x,y) in a reference image (FIG. 3A). Specifically, the cost calculator 310 calculates and outputs the costs C of the candidate corresponding pixels q(x+d,y) in the comparison image, which may correspond to the reference pixel p(x,y) in the reference image, based on a difference of luminance of the reference pixel p(x,y) in the reference image and luminance of the candidate corresponding pixels q(x+d,y) in the comparison image by shifting positions of the candidate corresponding pixels, identified by corresponding shift values d, on the epipolar line EL extended from the reference pixel p(x,y) in the reference image to the comparison image. Further, the cost calculator 310 can be configured to retain or store each of the calculated costs C in a memory.

For each of the shift values "d," the cost synthesizer 320 synthesizes the costs C of candidate corresponding pixels q(x+d,y) corresponding to one reference pixel p(x,y) output by the cost calculator 310, and the costs C of candidate corresponding pixels q'(x'+d,y') corresponding to other reference pixel p'(x',y') output by the cost calculator 310, and outputs the synthesized costs as the synthesis cost Ls. This synthesizing process is a process of calculating the directional path costs Lr based on the costs C using the equation (3), and then adding the directional path costs Lr for each of the directions using the equation (4) to calculate the synthesis cost Ls.

Further, the disparity value deriving unit 330 derives the shift value "d" corresponding to the smallest synthesis cost Ls, output by the cost synthesizer 320, as the disparity value Δ.

Further, the disparity value correction unit 340 applies a spatial filter such as a median filter to a region such as a local region in a reference image to correct disparity values of pixels. For example, the local region, composed of a plurality of pixels, includes a pixel as a center pixel, and other pixels surrounding the center pixel. The disparity value correction unit 340 applies the median filter to the plurality of pixels to correct a disparity value of a specific pixel.

Figure 14:
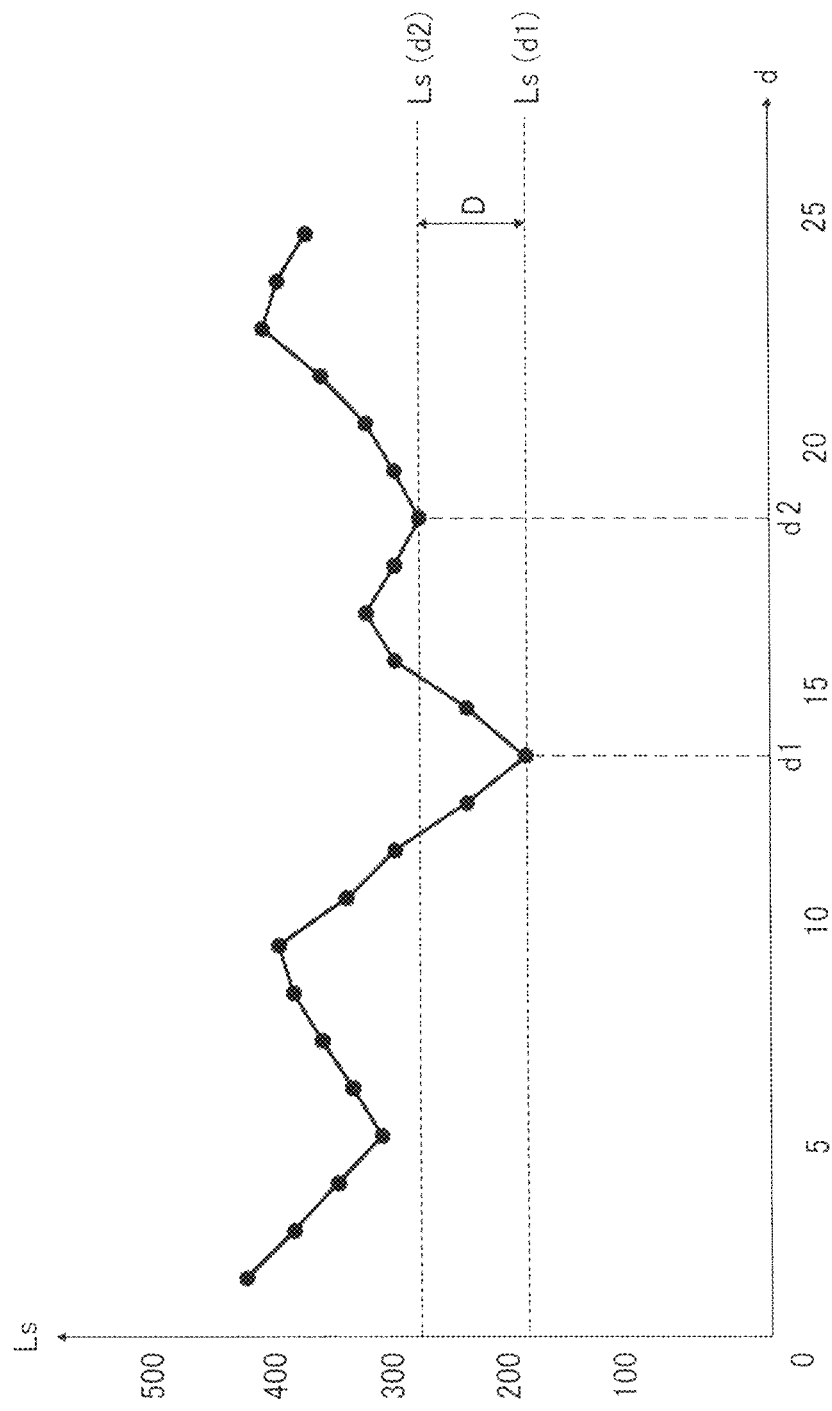
FIG. 14 is a graph plotting synthesis costs with respect to shift values.

Specifically, the disparity value correction unit 340 can be also used as a determination unit to determine whether a difference "D" between two local minimums of the synthesis costs output for each of shift values "d" is smaller than a given value "V" at a specific pixel, to be described later with reference to FIG. 14. FIG. 14 shows the difference "D" between two local minimums for a specific pixel among pixels on a reference image, in which two local minimums means a first local minimum (i.e., smallest local minimum among all local minimums of the synthesis costs) and a second local minimum (i.e., a local minimum greater than the first local minimum and smaller than other local minimums).

If the disparity value correction unit 340 determines that the difference "D" is smaller than the given value "V" at the specific pixel, the disparity value correction unit 340 corrects the disparity value Δ by excluding the specific pixel from the application of the median filter. Then, the disparity value correction unit 340 outputs the corrected disparity value Δ for all of corrected pixels.

The median filter is one type of filters used for removing noise from an image. Specifically, the median filter is applied to a local region, composed of a matrix of "n×n" such as a plurality of pixels, on an image, to arrange luminance values of the plurality of pixels from the smallest to the largest values, and then a luminance value at the center of arrangement is set as a luminance value of the center pixel of the local region.

When the median filter is applied to remove noise from an image, an edge remains in the image. Therefore, compared to applying a smoothing filter which may cause edge blurring, the median filter is preferably applied to disparity values used for the range finding. In this configuration, when the difference "D" is smaller than the given value "V," it means that the first local minimum and the second local minimum are close with each other, in which reliability of a disparity value Δ obtained from a shift value "d" corresponding to the smallest synthesis cost Ls (i.e., first local minimum) becomes lower, and thereby the disparity value Δ having lower reliability is excluded from the application of the median filter.

(Operation of Example Embodiment)

Referring to FIGS. 11 to 16, an operation according to one or more example embodiments is described. Specifically, a method of deriving the disparity value Δ is described with reference to FIG. 11, which is a flowchart illustrating operation of disparity computation according to one example embodiment.

At first, the imaging device 10a (FIG. 9) generates analog image data by capturing an image of the object E (step S1-1). Similarly, the imaging device 10b generates analog image data by capturing an image of the object E (step S1-2).

Then, the signal conversion device 20a converts the analog image data into digital image data (step S2-1). Similarly, the signal conversion device 20b converts the analog image data into digital image data (step S2-2).

Then, the signal conversion device 20a outputs the digital image data, converted at step S2-1, to the FPGA 31 of the image processing device 30 as data of a reference image (step S3-1), wherein an example of the reference image is shown in FIG. 2A. Similarly, the signal conversion device 20b outputs the digital image data, converted at step S2-2, to the FPGA 31 of the image processing device 30 as data of a comparison image (step S3-2). Since the comparison image, which is the image captured by the imaging device 10b, has no significant difference from the reference image shown in FIG. 2A, an example view of the comparison image is omitted.

Then, the cost calculator 310 (FIG. 10) calculates the costs C for each one of the shift values "d" based on the data of the reference image and the data of the comparison image (step S4).

Then, the cost synthesizer 320 (FIG. 10) calculates the directional path cost Lr by using the equation (3), and further the cost synthesizer 320 calculates the synthesis cost Ls by using the equation (4') (step S5). Then, the disparity value deriving unit 330 derives the shift value "d" corresponding to the smallest synthesis cost Ls output by the cost synthesizer 320 as the disparity value Δ (step S6).

Figures 12, 13A, 13B:
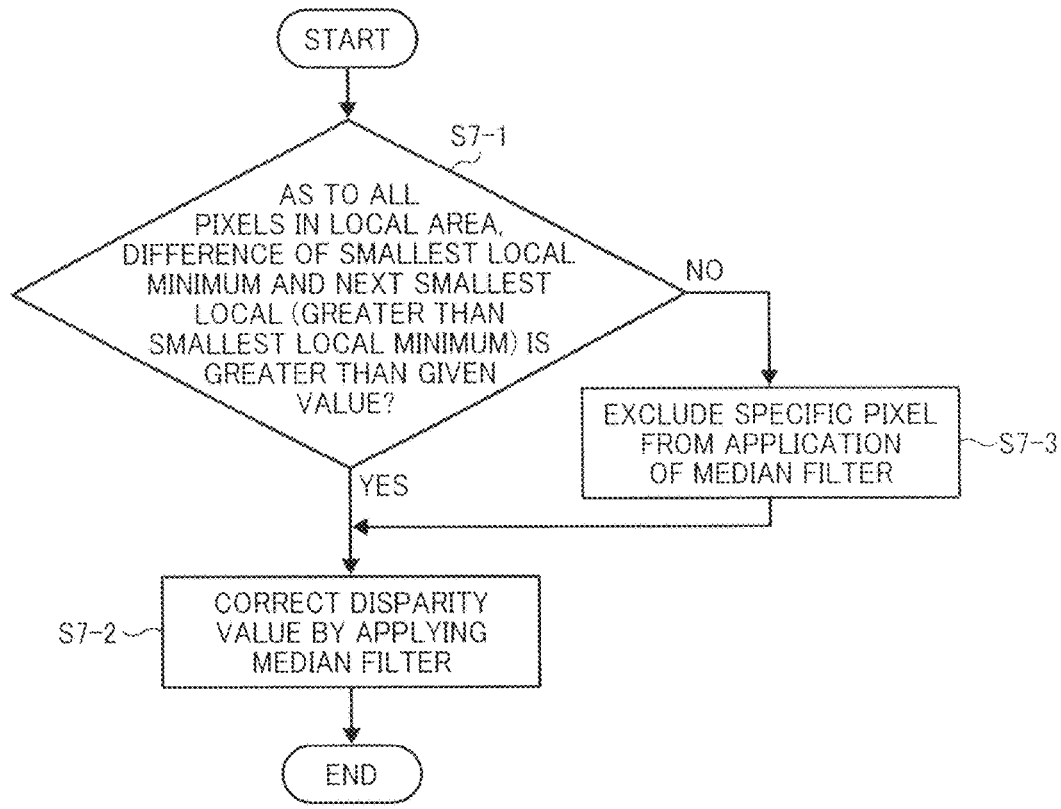
FIG. 12 is a flowchart illustrating operation of correcting a disparity value.
FIGS. 13A and 13B illustrate an example of schematic diagram of applying a median filter.
Figure 15A:
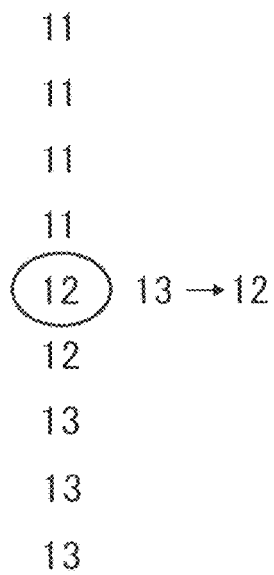
FIG. 15A and FIG. 15B are schematic diagrams for explaining a process of correcting disparity values by applying a median filter.
Figure 15B:
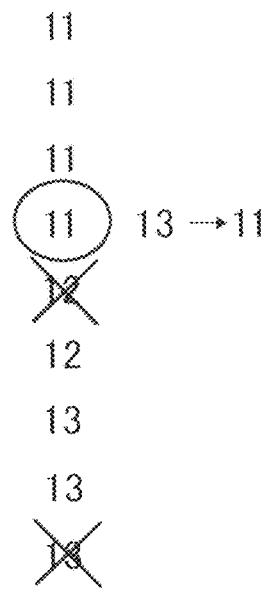
Figure 16:
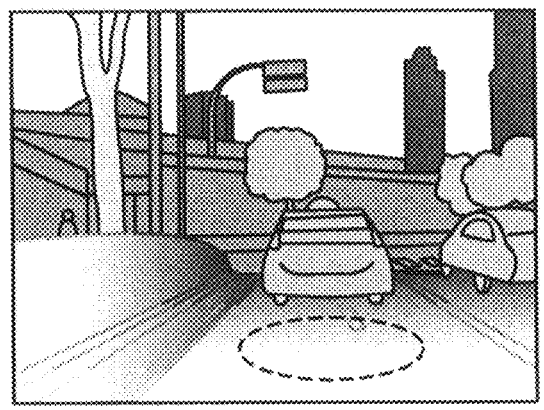
FIG. 16 is an example of high density disparity image generated by correcting disparity values.

Then, the disparity value correction unit 340 applies a median filter to a plurality of pixels having a center pixel and other pixels surrounding the center pixel in the reference image to correct the disparity value Δ at a given pixel (step S7). A description is given of a process of correcting a disparity value at step S7 in detail with reference to FIGS. 12 to 16. FIG. 12 is a flowchart illustrating operation of correcting disparity values. FIGS. 13A and 13B illustrate an example of schematic diagram of applying a median filter. FIG. 14 is an example of a synthesis cost profile plotting synthesis costs with respect to each of disparity values. FIG. 15A and FIG. 15B are schematic diagrams for explaining a process of correcting disparity values by applying a median filter. FIG. 16 is an example of high density disparity image generated by correcting disparity values.

At first, as illustrated in FIG. 12, the disparity value correction unit 340 can be used as a determination unit that determines whether a difference "D" between two local minimums of the synthesis costs Ls is greater than a given value "V" for all of pixels in one local region to be applied with a median filter (step S7-1), in which two local minimums means a first local minimum (i.e., smallest local minimum among all local minimums of synthesis costs Ls) and a second local minimum (i.e., a local minimum greater than the first local minimum and smaller than other local minimums), which is illustrated in FIG. 14. A description is given of details of the process at step S7-1 with reference to an example case of FIGS. 13 and 14. For the simplicity of description, the median filter is applied to a local region composed of 3×3 pixels (i.e., nine pixels) in this example case.

FIG. 13A shows disparity values for each of nine pixels. For example, the disparity value of the center pixel of the local region to be applied with the median filter has a disparity value Δ=13. Then, as illustrated in FIG. 14, the disparity value correction unit 340 (determination unit) determines whether the difference "D" between the two local minimums of the synthesis costs is greater than the given value "V" for each of pixels, in which two local minimums means the above mentioned first local minimum and the second local minimum, in which the synthesis cost for the first local minimum is referred to "Ls(d1)," and the synthesis cost for the second local minimum is referred to "Ls(d2)" as illustrated in FIG. 14. For example, when the given value "V" is set 80, the disparity value correction unit 340 (determination unit) determines whether the difference "D" is greater than "80" for each of the pixels to obtain a result illustrated in FIG. 13B, in which "o" corresponds to a pixel where the difference D is the value "V" or more and to be applied with the median filter, and "x" corresponds to a pixel where the difference D is smaller than the value "V" and thereby excluded from the application of the median filter.

When the disparity value correction unit 340 (determination unit) determines that a pixel where the difference D is smaller than the given value "V" does not exist for all pixels in the local region, which means the difference D is greater than the given value "V" for all pixels (S7-1: Yes), the disparity value correction unit 340 applies the median filter to the local region to correct the disparity values without excluding any pixels from the application of the median filter (step S7-2). For example, when the disparity value correction unit 340 applies the median filter to all pixels in the local region (step S7-2), as illustrated in FIG. 15A, the disparity value correction unit 340 arranges nine disparity values from the smallest to largest values and sets a disparity value at the center of the nine disparity values as the disparity value of the center pixel of the local region. Since the disparity value at the center of the nine disparity values is "12" in this example case, the disparity value of the center pixel is corrected from "13" to "12."

By contrast, when the disparity value correction unit 340 (determination unit) determines that the difference D is less than the given value "V" for any specific pixel in the local region (S7-1: No), the disparity value correction unit 340 excludes the specific pixel from the application of the median filter (S7-3). Then, the disparity value correction unit 340 conducts the process of step S7-2 to the remaining pixels. For example, when the difference "D" (FIG. 14) at the center-top pixel and the right-top pixel in the local region (see FIG. 13A) is smaller than the given value "V," the center-top pixel and the right-top pixel are excluded from the application of the median filter as indicated by "x" in FIG. 13B, and then, the disparity value correction unit 340 applies the median filter to remaining pixels in the local region (step S7-2). For example, as illustrated in FIG. 15B, the disparity value correction unit 340 arranges nine disparity values from the smallest to largest values, excludes the disparity values of the center-top pixel and the right-top pixel ("x" in FIG. 13B) from the application of the median filter, and then sets a disparity value at the center of the disparity values of remaining pixels (i.e., after excluding the center-top pixel and the right-top pixel) as the disparity value of the center pixel of the local region (FIG. 15B). Since the disparity value at the center of the disparity values is "11" (FIG. 15B) in this case, the disparity value of the center pixel is corrected from "13" to "11."

In the above described configuration, when the disparity value correction unit 340 applies the median filter to an image as above described, the high density disparity image illustrated in FIG. 2B can be generated as a high density disparity image illustrated in FIG. 16. In the high density disparity image illustrated in FIG. 2B, noise occurs at the rear side of a car, but the noise is removed in the high density disparity image illustrated in FIG. 16. Further, the given value "V" can be changed by a user or the like. In the above described configuration, the greater the given value "V," the higher the reliability of the disparity value Δ. However, if the given value "V" is set too great, the number of pixels excluded from the application of the median filter becomes greater because these pixels are determined not reliable. Therefore, if the given value "V" is set too great, it becomes difficult to derive a correct disparity value.

A description is given of generation of high density disparity image when the disparity value correction unit 340 uses the given value "V" with reference to FIG. 17. FIG. 17A is an example of a reference image, FIG. 17B is a part of the reference image of FIG. 17A, FIG. 17C is a high density disparity image generated by applying a conventional method of SGM to the reference image of FIG. 17B, FIG. 17D is a high density disparity image generated by correcting the reference image of FIG. 17B with the disparity correction unit 340 using a given first value "V1", and FIG. 17E is a high density disparity image generated by correcting the reference image of FIG. 17B with the disparity correction unit 340 using a given second value "V2" greater than the first value "V1" (V1<V2), in which the reference image of a road sign M is shown. As illustrated in FIGS. 17C, D and E, the high density disparity image becomes an image closer to a shape of a real object by correcting the disparity values by using the disparity value correction unit 340, in which the shape of the object in the image becomes smaller and sharp. Further, if the first value "V1" is set to a greater value such as the second value "V2," the high density disparity image becomes an image further closer to the shape of the real object. However, if the given value "V" is set greater than the second value "V2" such as a third given value "V3" of 200 (V3=200) or more, even if the difference "D" between the first local minimum and the second local minimum of the synthesis cost "Ls" is relatively greater in the synthesis cost profile shown in FIG. 14 for specific pixels, the specific pixels are excluded from the application of a spatial filter such as the median filter, with which the reliability of disparity values deteriorates. In this example case, the first value "V1" is set 50, and the second value "V2" is set 100 (V1=50, V2=100), and further, conditions of "50≤V1≤100, 70≤V2≤200, V1+20<V2" can be set.

As to the above described one or more example embodiments, by applying a spatial filter such as a median filter, even if disparity values include too great or too small disparity values, the disparity values can be smoothed and derived accurately. Further, by excluding disparity values having low reliability from the application of the spatial filter such as the median filter, the disparity values can be derived further accurately.

(Additional Configuration of Example Embodiment)

Although the cost C is used as an indicator of "dissimilarity" in the above description, the cost C can be used as an indicator of "similarity" that is the opposite of "dissimilarity." When the cost C is used as an indicator of similarity, the disparity value Δ at which the cost C becomes the "maximum" is derived instead of using the disparity value Δ at which the cost C becomes the "minimum," and the disparity value Δ at which the synthesis cost Ls becomes the "maximum" is derived instead of using the disparity value Δ at which the synthesis cost Ls becomes the "minimum." In this description, the similarity and dissimilarity may be collectively referred to as "matching level" of the cost. The synthesis cost can be referred to aggregation cost, and the process of synthesizing costs can be referred to the process of aggregating costs.

In the above description, the synthesis cost Ls is calculated by the equation (4) that totals the directional path costs Lr for all of the directional paths "r" calculated by the equation (3), but the synthesis cost Ls is not limited hereto. For example, the directional path cost Lr in a single directional path can be used as the synthesis cost Ls, or the directional path costs Lr in two or more directional paths can be synthesized as the synthesis cost Ls.

In the above description, the disparity value correction unit 340 (determination unit) determines whether the difference "D" between the first local minimum (i.e., smallest local minimum among all local minimums of synthesis costs) and the second local minimum (i.e., a local minimum greater than the first local minimum and smaller than other local minimums) of the synthesis costs Ls is greater than a given value "V" for a specific pixel among pixels in a reference image, but not limited hereto. For example, to derive the disparity value Δ for a road face where a change in the horizontal direction does not appear clearly, the determination to exclude specific pixels from the application of the median filter is conducted only to pixels on the directional paths of $r_0$ and $r_{180}$. Further, to derive the disparity value Δ for a sign and/or a car where a change in the vertical direction does not appear clearly, the determination to exclude specific pixels from the application of the median filter is conducted only to pixels on the directional paths of $r_{90}$ and $r_{270}$.

In the above description, the process is described based on the units of pixels rather than the units of areas composed of a plurality of pixels for the simplification of description, but the process can be conducted based on the units of areas. When the process is conducted based on the unit of the areas composed of the plurality of pixels, an area including a reference pixel is used as a reference area, and an area including a corresponding pixels, which may correspond to the reference pixel, is used as a corresponding area. Further, the reference area can be composed of a single reference pixel, and the corresponding area can be composed of a single corresponding pixel.

Further, as to the above described example embodiment, the two imaging devices 10a and 10b are used but not limited hereto. For example, one imaging device can be used, in which an imaging area is separated into two areas on one image sensor to capture the reference image and the comparison image of the object E.

Further, in the above described example embodiment, a description is given of the object recognition system 1 mounted on a vehicle such as an automobile but not limited hereto. For example, other than the automobile, the object recognition system 1 is mountable on vehicles such as motor bicycles, bicycles, wheelchairs, agricultural tractors and construction machines or the like. Further, the object recognition system 1 is mountable on vehicles, which are examples of movable apparatuses, and also on robots, which is another example of movable apparatuses.

Further, the robots are not limited to the movable apparatuses but can be fixed apparatuses such as industrial robots fixed at a given place such as robots for factory automation (FA). Further, the fixed apparatuses may not be limited to the robots, but can be security monitoring cameras or the like.

Further, instead of calculating the distance Z by using the external CPU (e.g., CPU 52 in the object recognition apparatus 5), the FPGA 31 can calculate the distance Z under an instruction from the CPU 32 of the image processing device 30.

Further, the above described method of deriving disparity value Δ can be also the method of producing disparity value Δ.

Further, in the above described example embodiment, a description is given of the median filter but not limited hereto. For example, a known spatial filter such as a smoothing filter can be applied, in which the disparity value correction unit 340 (determination unit) determines whether the difference "D" between a first local minimum (i.e., smallest local minimum among all local minimums of the synthesis costs) and a second local minimum (i.e., a local minimum greater than the first local minimum and smaller than other local minimums) of the synthesis costs "Ls" is smaller than a given value "V" for a specific pixel among pixels in a reference image, and if the disparity value correction unit 340 determines that the difference "D" is smaller than the given value "V," the disparity value correction unit 340 corrects the disparity value Δ by excluding the specific pixel from the application of the known spatial filter such as the smoothing filter.

(Configurations)

The above described example embodiments include at least following configurations.

(Configuration 1)

As to the above described example embodiments, a disparity deriving apparatus can derive disparity of an object using a reference image of the object captured by a first imaging device, and a comparison image of the object captured by a second imaging device, in which the disparity is indicated by a disparity value. The disparity deriving apparatus includes a calculator such as the cost calculator 310, a synthesizer such as the cost synthesizer 320, a deriving unit such as the disparity value deriving unit 330, and a correction unit such as the disparity value correction unit 340. Further, the imaging device 10a is one example of the first imaging device, and the imaging device 10b is one example of the second imaging device.

The calculator calculates a cost C between the reference image and the comparison image by computing a difference of luminance of a reference area (e.g., pixel) in the reference image, and luminance of each one of candidate corresponding areas (e.g., pixel) in the comparison image, corresponding to the reference area, by shifting positions of the candidate corresponding areas on the epipolar line EL in the comparison image, wherein the epipolar line EL is extended from the reference area in the reference image, in which the positions of the candidate corresponding areas can be identified based on the corresponding shift value d, and the cost C represents a level of dissimilarity or a level of similarity between luminance of the reference area and luminance of the candidate corresponding areas.

The synthesizer synthesizes costs between a first reference area and each of candidate corresponding areas in the comparison image, corresponding to the first reference area in the reference image, wherein the costs are calculated by the calculator, and costs between a second reference area and each of candidate corresponding areas in the comparison image, corresponding to the second reference area surrounding the first reference area in the reference image, wherein the costs are calculated by the calculator, for each of the shift values as synthesis costs, and outputs each of the synthesis costs for each of the shift values.

The deriving unit derives a disparity value based on a shift value corresponding to the smallest synthesis cost when the cost represents the level of dissimilarity among the synthesis costs output by the synthesizer, or the deriving unit derives a disparity value based on a shift value corresponding to the largest synthesis cost when the cost represents the level of similarity among the synthesis costs output by the synthesizer.

The correction unit applies a spatial filter to a local region, composed of a plurality of areas, in the first reference image to correct a disparity value of the local region.

(Configuration 2)

As to the disparity deriving apparatus of the above configuration 1, when a difference "D" between two local minimums of the synthesis cost used for deriving the disparity value is smaller than a given value "V" at a specific area in a local region on a reference image, the correction unit corrects the disparity value by applying a spatial filter to the local region while excluding the specific area from an application of the spatial filter.

(Configuration 3)

As to the disparity deriving apparatus of the above configuration 1, when the cost C is used as an indicator of "similarity" instead of an indicator of "dissimilarity," instead a shift value corresponding to of the "minimum synthesis cost, the deriving unit derives a shift value corresponding to the "maximum" synthesis cost as a disparity value of the first reference area (Configuration 4)

As to the disparity deriving apparatus of the above configuration 3, when the cost C is used as the indicator of "similarity" instead of an indicator of "dissimilarity," two local maximums of the synthesis costs are used instead of the two local minimums of the synthesis costs when the determination unit determines whether the difference "D" between the two local maximums of the synthesis cost output for each of the shift values used for deriving the disparity value is smaller than a given value V for a specific area of the local region on the reference image, in which the two local maximums means a first local maximums (i.e., greatest local minimum among all local maximums of the synthesis costs) and a second local maximum (i.e., a local maximum smaller than the first local maximum and greater than other local minimums).

As to the above described one or more example embodiments, even if an object having weak texture and an object having strong texture exist in the same scene, by applying a spatial filter to disparity values, an effect of disparity of the strong-texture object to disparity of the weak texture object can be reduced. Therefore, disparity detection can be performed with high precision.

The present invention can be implemented in any convenient form, for example using dedicated hardware, or a mixture of dedicated hardware and software. The computer software can be provided to the programmable device using any storage medium or carrier medium for storing processor-readable code such as a floppy disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The computer software can be provided from a transmitting apparatus, which transmits signals, via a transmission medium such as public phone line, dedicated line, or other communication line, in which a part of the computer software is transmitted on the transmission medium, which means it is not required to transmit the entire data of the computer software is being transmitted on the transmission medium at one time. The signals include data signals of the computer software and other data. The transmitting apparatus can transmit the computer software by transmitting data of the computer software continuously or intermittently.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps.

In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A disparity deriving apparatus for deriving disparity of an object based on a reference image of the object captured at a first image capturing position and a comparison image of the object captured at a second image capturing position, the disparity deriving apparatus comprising:
   processing circuitry configured to
      calculate costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image;
      synthesize the costs of the first reference area, and the costs of the second reference area as synthesis costs;
      derive a disparity value of the object captured in the first reference area based on the synthesized synthesis costs; and
      apply a spatial filter to a local region, composed of a plurality of areas, each area of the plurality of areas having a corresponding disparity value, in the first reference area to correct a specific disparity value in the local region by changing the specific disparity value in the local region to a new value using the spatial filter, wherein, in applying the spatial filter to the disparity values of the local region, excluding a disparity value of one area of the local region having low reliability from the application of the spatial filter.

2. The disparity deriving apparatus of claim 1, wherein when a difference between two local minimums of the synthesis costs is smaller than a given value at the one area of the areas of the local region in the first reference image, the processing circuitry corrects the specific disparity value of the local region while excluding the one area from the application of the spatial filter.

3. The disparity deriving apparatus of claim 1, wherein the processing circuitry is further configured to:
   determine whether a difference between two local minimums of the synthesis costs is smaller than a given value at the one area of the areas of the local region in the first reference area, wherein the processing circuitry corrects the specific disparity value of the local region while excluding the one area from an application of the spatial filter when the processing circuitry determines that the difference is smaller than the given value.

4. The disparity deriving apparatus of claim 3, wherein the processing circuitry conducts the determination for the local region on a specific directional path of directional paths in the first reference image.

5. The disparity deriving apparatus of claim 1, wherein the given region is changeable.

6. A movable apparatus comprising:
   the disparity deriving apparatus of claim 1.

7. The movable apparatus of claim 6, wherein the movable apparatus is one of a vehicle and a robot.

8. A robot comprising the disparity deriving apparatus of claim 1.

9. The robot of claim 8, wherein the robot is a fixed industrial robot.

10. The disparity deriving apparatus of claim 1, wherein the processing circuitry is further configured to identify the one area to be excluded from application of the spatial filter when a difference between two local minimums of the synthesis costs for the one area is smaller than a given value.

11. The disparity deriving apparatus of claim 1, wherein the processing circuitry is further configured to exclude the disparity of the one area of the local region in applying the spatial filter to correct the specific disparity value, the specific disparity value corresponding to an area of the local region other than the one area of the local region.

12. A method of deriving disparity of an object based on a reference image of the object captured at a first image capturing position and a comparison image of the object captured at a second image capturing position, the method comprising:
   calculating costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image;
   synthesizing the costs of the first reference area, and the costs of the second reference area as synthesis costs;
   deriving a disparity value of the object captured in the first reference area based on the synthesis costs synthesized by the synthesizing step; and
   applying a spatial filter to a local region, composed of a plurality of areas, each area of the plurality of areas having a corresponding disparity value, in the first reference area to correct a specific disparity value in the local region by changing the specific disparity value in the local region to a new value using the spatial filter, wherein the applying step includes, in applying the spatial filter to the disparity values of the local region, excluding a disparity value of one area of the local region having low reliability from the application of the spatial filter.

13. A method of producing disparity of an object based on the reference image of the object captured at the first image capturing position and the comparison image of the object captured at the second image capturing position, the method comprising the steps of claim 12.

14. A non-transitory computer-readable carrier medium storing a program that, when executed by a computer, causes the computer to execute a method of deriving disparity of an object based on a reference image of the object captured at a first image capturing position and a comparison image of the object captured at a second image capturing position, the method comprising the steps of claim 12.

15. The method of claim 12, wherein when a difference between two local minimums of the synthesis costs is smaller than a given value at the one area of the areas of the local region in the first reference image, the applying step includes correcting the specific disparity value of the local region while excluding the one area from the application of the spatial filter.

16. The method of claim 12, further comprising determining whether a difference between two local minimums of the synthesis costs is smaller than a given value at the one area of the areas of the local region in the first reference area, wherein the applying step includes correcting the specific disparity value of the local region while excluding the one area from an application of the spatial filter when it is determined that the difference is smaller than the given value.

17. The method of claim 16, wherein the determining step further comprises determining whether the difference is smaller than the given value for the local region on a specific directional path of directional paths in the first reference image.

18. The method of claim 17, wherein the given region is changeable.

19. A disparity deriving apparatus for deriving disparity of an object based on a reference image of the object captured at a first image capturing position and a comparison image of the object captured at a second image capturing position, the disparity deriving apparatus comprising:
   processing circuitry configured to
   calculate costs between a first reference area in the reference image and each one of corresponding areas corresponding to the first reference area in a given region in the comparison image, and costs between a second reference area, surrounding the first reference area in the reference image, and each one of corresponding areas corresponding to the second reference area in a given region in the comparison image;
   synthesize the costs of the first reference area, and the costs of the second reference area as synthesis costs;
   derive a disparity value of the object captured in the first reference area based on the synthesized synthesis costs; and
   apply a spatial filter to a local region, composed of a plurality of areas, each area of the plurality of areas having a corresponding disparity value, in the first reference area to correct a specific disparity value in the local region by changing the specific disparity value in the local region to a new value using the spatial filter, wherein in applying the spatial filter to the disparity values of the local region, excluding a disparity value of one area of the areas of the local region having low reliability from an application of the spatial filter, and output the corrected specific disparity value to an object recognition apparatus that recognizes the object in the reference image or the comparison image, wherein an image area corresponding to the object, expressed by the disparity value derived by the processing circuitry and recognizable by the object recognition apparatus, becomes smaller as the given value becomes greater.

* * * * *